(12) United States Patent
Martinelli

(10) Patent No.: US 12,526,133 B2
(45) Date of Patent: Jan. 13, 2026

(54) QUANTUM KEY DISTRIBUTION NETWORK AND MULTIFUNCTIONAL NODE THEREOF

(71) Applicant: POLITECNICO DI MILANO, Milan (IT)

(72) Inventor: Mario Martinelli, Milan (IT)

(73) Assignee: POLITECNICO DI MILANO, Milan (IT)

( * ) Notice: Subject to any disclaimer, the term of this patent is extended or adjusted under 35 U.S.C. 154(b) by 176 days.

(21) Appl. No.: 18/555,583

(22) PCT Filed: May 6, 2022

(86) PCT No.: PCT/IB2022/054201
§ 371 (c)(1),
(2) Date: Oct. 16, 2023

(87) PCT Pub. No.: WO2022/248953
PCT Pub. Date: Dec. 1, 2022

(65) Prior Publication Data
US 2024/0204995 A1    Jun. 20, 2024

(30) Foreign Application Priority Data

May 26, 2021   (IT) .......................... 102021000013700

(51) Int. Cl.
*H04L 9/08*   (2006.01)
(52) U.S. Cl.
CPC ................... *H04L 9/0852* (2013.01)
(58) Field of Classification Search
CPC ............................ H04L 9/0852; H04L 9/0858
See application file for complete search history.

(56) References Cited

U.S. PATENT DOCUMENTS

2007/0248229 A1    10/2007   Kawamoto et al.
2019/0379463 A1*   12/2019   Shields ................. H04L 9/0852

FOREIGN PATENT DOCUMENTS

CN        109 274 491 A       1/2019

OTHER PUBLICATIONS

International Search Report issued Sep. 1, 2022, in corresponding International Application No. PCT/IB2022/054201, 9 pages.

(Continued)

*Primary Examiner* — Baotran N To
(74) *Attorney, Agent, or Firm* — Maier & Maier, PLLC

(57) ABSTRACT

A network for the distribution of a quantum key and a multifunctional node thereof. The network includes a source node, a single photon source, and a plurality of multifunctional nodes connected to the source node by respective optical communication channels. Each multifunctional node includes a transmitting unit, a polarization stabilizer connected to an optical input port to receive a photon transmitted by the source node, a first and second waveplate downstream of the polarization stabilizer and controlled by a first actuator. Each multifunctional node further includes a receiving unit, the polarization stabilizer, the first waveplate controlled by a second actuator, a polarizing beam splitter downstream of the first waveplate and configured to detect a logic state of each photon, at least one photodetector and a counting register configured to receive the logic state of the detected photon. Each multifunctional node further comprises an optical switch between the second retarder waveplate.

15 Claims, 4 Drawing Sheets

(56) References Cited

OTHER PUBLICATIONS

Ma Lijun et al: "High Speed Quantum Key Distribution over Optical Fiber Network System 1", May 1, 2009 (May 1, 2009), pp. 1-31, Information Technology Laboratory, National Institute of Standards and Technology, 31 pages.

* cited by examiner

QUANTUM KEY DISTRIBUTION NETWORK AND MULTIFUNCTIONAL NODE THEREOF

TECHNICAL FIELD

The present invention relates to the technical field of quantum cryptography. In particular, the present invention relates to a network for the distribution of a quantum key and a multifunctional node thereof.

BACKGROUND

Quantum key distribution (QKD) is a technology that makes it possible to share a symmetrical (i.e. a sequence of bits that materialises simultaneously in the transmitter and receiver) and unconditionally secure "key" (i.e. one that cannot be decrypted with any algorithm or computing power) between two nodes (hereafter transmitter Tx and receiver Rx). The adjective quantum refers to the fact that the key is generated using the spin state of a single photon (classically known as the polarization state).

It is known from quantum mechanics that the spin state of a particle can only be exactly measured if it is in the exact reference base (which can be rectilinear, diagonal or circular), otherwise the measurement generates a completely random value. The second quantum property that is exploited is the impossibility of cloning the spin state of a particle. The third quantum property relates to light and the possibility of generating and propagating a single photon in any optical communication channel (free space, optical fibre or optical-integrated guide).

Based on these properties of the photons, in 1984 C. H. Bennet and G. Brassard developed a protocol known as BB84, which will be referred to in the present patent application.

In the BB84 protocol, the transmitter Tx transmits a sequence of single photons generated in a known base and in a known state or code (according to a logic sequence of bits). The receiver Rx receives the single photons (except those lost through attenuation) and measures the state in a randomly chosen base. The measurement of the state generates the logic sequence of bits. The receiver Rx transmits to the transmitter Tx, with a public communication channel, the sequence of bases used in the measurement. The transmitter Tx transmits to the receiver Rx confirmation of the exact ones. In this way, the transmitter Tx and the receiver Rx share a logic sub-sequence of bits that constitutes the quantum key.

The original scheme of the QKD according to the BB84 protocol refers to a point-to-point transmission (i.e. the transmitter Tx is connected with only one receiver Rx) and concerns the communication of a quantum key between the transmitter Tx and the receiver Rx through an optical communication channel without birefringence. In the more general case where there is an optical communication channel that exhibits birefringence, at the end of transmission the original base must be restored through a device called a polarization stabilizer.

The transmitter Tx comprises a single photon source, i.e. a source weakened in intensity so as to transmit on average only one photon (faint source), and a first and second waveplate, controlled by an actuator, to which the single polarized photons exiting the single photon source are sent. The first waveplate allows to establish the base (which may be rectilinear, diagonal or circular) of the spin of the photon, while the second waveplate allows to establish the state or code which generates the logic sequence of bits which constitutes the key (e.g. high logic state equivalent to 1, low logic state equivalent to 0).

The receiver Rx comprises a polarization stabilizer, in the case of a birefringent optical communication channel, which enables the initial base to be reoriented, and a waveplate, controlled by an actuator, placed downstream of the polarization stabilizer, which enables the initial base to be restored (or not) by a random process. The receiver also comprises a Polarizing Beam Splitter (PBS), to which each photon exiting the waveplate is addressed and which is configured to distinguish the high logic state and the low logic state of the polarized photon and to transmit them to a photodetection unit, from this to a counting register, so that the code transmitted by the transmitter Tx can be reconstructed.

The components of the transmitter Tx and the receiver Rx are also connected therebetween by a synchronism channel, so as to distribute, between the transmitter and the receiver, a synchronism signal, typically generated by a control signal of a shutter, placed at the transmitter Tx, immediately downstream of the single photon source, or by the same pulse of the single photon source.

In the quantum key distribution system described above, both the basic information and the code information are possessed by the receiver Rx and this fully satisfies the integrity of the BB84 protocol. However, a system so configured has some disadvantages.

Firstly, if a system component is modified or upgraded, the entire transmitter Tx and/or the entire receiver Rx must be upgraded, which is functionally disadvantageous as well as being economically costly.

Secondly, and as is well known, sometimes the single photon source and the photodetection unit in the device have to be kept at very low temperatures, so that the transmitter Tx and the receiver Rx of the device have to be placed in cryogenically controlled environments, which is logistically disadvantageous, with a negative impact in terms of space and maintenance.

SUMMARY

It is an object of the present invention to overcome the disadvantages of the prior art.

In particular, it is an object of the present invention to present a network for the distribution of a quantum key, and a multifunctional node thereof, configured to allow greater flexibility in the definition of the network architecture.

It is also an object of the present invention to present a network for the distribution of a quantum key, in which each node is configured to exchange a quantum key with any other node of the network, while maintaining a sharing of the source node.

These and other objects of the present invention are achieved by a network for the distribution of a quantum key, and by a multifunctional node thereof, incorporating the features of the appended claims, which form an integral part of the present description.

According to a first aspect, the invention is directed to a network for the distribution of a quantum key comprising a source node, which node includes a single photon source, and a plurality of multifunctional nodes, which are connected to the source node, and therebetween, by respective optical communication channels.

Each multifunctional node comprises a transmitting unit, including a polarization stabilizer, connected to an optical input port to receive a photon transmitted by the source node, a first waveplate and a second waveplate, placed downstream of the polarization stabilizer and controlled by a first actuator.

Each multifunctional node further comprises a receiving unit, including the polarization stabilizer, the first waveplate controlled by a second actuator, a polarizing beam splitter, placed downstream of the first waveplate and configured to detect a logic state of each photon, at least one photodetector and a counting register configured to receive the logic state of the detected photon.

Each multifunctional node further comprises an optical switch placed between the second waveplate and the polarizing beam splitter and which can be activated/deactivated to operate the multifunctional node according to a transmitter configuration, wherein the transmitting unit modulates the photon entering the multifunctional node through the optical input port, and provides the modulated polarized photon at an optical output port of the multifunctional node, or according to a receiver configuration, wherein the receiving unit demodulates the modulated photon, entering the multifunctional node through the optical input port.

Thanks to this combination of features, the single photon source is shared by all multifunctional nodes of the network. This entails economic advantages, since the cost of the source node is shared by all multifunctional nodes, but above all it has logistical and functional advantages, because the single photon source can be hosted in specific rooms, where for example there is the possibility of using cryogenic devices, or in rooms watched by specialized technical personnel.

In addition, the source node can be updated without affecting the multifunctional nodes of the network. In a context of strong technological innovation, this functionality is extremely important in terms of enhancement of the investment made in the construction of the system.

Moreover, as the multifunctional nodes are structurally the same, regardless of their function, the network allows economies of scale to be achieved. Each multifunctional node can in fact exchange the quantum key with any other node of the network within a time window assigned to it by a supervisor device.

In one embodiment, the network comprises a supervisor device and an optical switching array is associated to each multifunctional node, wherein the optical switching array is operable by the supervisor device to select the multifunctional nodes forming the optical communication channel for the distribution of the quantum key exiting the source node.

In one embodiment, the optical switching array has first ports, to which an input optical communication channel and an output optical communication channel of a respective multifunctional node are respectively connected, and second ports, which are connected to the source node and/or to corresponding second ports of an optical switching array of at least one other multifunctional node of the network.

In one embodiment, each multifunctional node further comprises a mirror which is placed upstream of the optical output port.

In one embodiment, each multifunctional node comprises two further optical switches, one being placed between the optical input port and the polarization stabilizer and the other being placed upstream of the optical output port. The two further optical switches can be activated to operate the multifunctional node according to a pass-through configuration, wherein the optical input port is in direct communication with the optical output port of the multifunctional node through a pass-through optical communication channel which passes through the two further optical switches.

In one embodiment, the optical switches of each multifunctional node are operable by the supervisor device to configure each multifunctional node in the transmitter, receiver or pass-through configuration.

In one embodiment, the source node comprises a shutter, placed downstream of the single photon source and configured to generate a synchronism signal, which is distributed among all nodes in the network along a synchronism line.

In one embodiment, the single photon source of the source node is configured to generate a pair of photons, one of which is used in the network to generate the quantum key, and the other is used to establish the synchronism signal to be distributed along the network along a synchronism channel.

In accordance with a second aspect, the invention is also directed to a multifunctional node comprising a transmitting unit, including a polarization stabilizer, connected to an optical input port to receive a photon transmitted by the source node, a first waveplate and a second waveplate, placed downstream of the polarization stabilizer and controlled by a first actuator.

The multifunctional node further comprises a receiving unit, including the polarization stabilizer, the first waveplate controlled by a second actuator, a polarizing beam splitter, placed downstream of the first waveplate and configured to detect a logic state of each photon, at least one photodetector and a counting register configured to receive the logic state of the detected photon.

The multifunctional node further comprises an optical switch placed between the second waveplate and the polarizing beam splitter and which can be activated/deactivated to make the multifunctional node operate according to a transmitter configuration, wherein the transmitting unit modulates the photon entering the multifunctional node through the optical input port, and provides the modulated polarized photon at an optical output port of the multifunctional node, or a receiver configuration, wherein the receiving unit demodulates the modulated photon, entering the multifunctional node through the optical input port.

In one embodiment, in the transmitter configuration, the optical switch is switched on and the second actuator for controlling the first waveplate is deactivated, so as to interrupt the connection between the second actuator and the first waveplate, while in the receiver configuration the optical switch is switched off, the first actuator controlling the first waveplate and the second waveplate is deactivated, so as to interrupt the connection between the first actuator and the first waveplate, and the second waveplate is set at zero birefringence value.

In one embodiment, the multifunctional node further comprises a mirror which is placed upstream of the optical output port.

In one embodiment, the multifunctional node comprises two further optical switches, one being placed between the optical input port and the polarization stabilizer and the other being placed upstream of the optical output port. The two further optical switches can be activated to operate the multifunctional node according to a pass-through configuration, wherein the optical input port is in direct communication with the optical output port of the multifunctional node through a pass-through optical communication channel which passes through the two further optical switches.

In one embodiment, the transmitting unit is connected between the optical input port and the optical output port through a transmission optical communication channel, while the receiving unit is connected to the optical input port through a receiving optical communication channel.

In one embodiment, in the transmitter configuration, the optical switch is switched on, the further optical switches are switched off and the second actuator for controlling the first waveplate is deactivated, so as to interrupt the connection between the second actuator and the first waveplate, while in the receiver configuration both optical switches are switched off, the first actuator controlling the first waveplate and the second waveplate is deactivated, so as to interrupt the connection between the first actuator and the first waveplate, and the second waveplate is set at zero birefringence value.

In one embodiment, in the pass-through configuration, the two further optical switches are switched on.

Further features and objects of the present invention will be more evident from the following description.

BRIEF DESCRIPTION OF THE DRAWINGS

The invention is described hereinbelow with reference to certain examples provided by way of non-limiting example and illustrated in the accompanying drawings. These drawings illustrate different aspects and embodiments of the present invention and reference numerals illustrating structures, components, materials and/or similar elements in different drawings are indicated by similar reference numerals, where appropriate.

DETAILED DESCRIPTION OF THE EMBODIMENTS

While the invention is susceptible to various modifications and alternative constructions, some embodiments provided for explanatory purposes are described below in detail.

It must in any case be understood that there is no intention to limit the invention to the specific embodiment illustrated, but, on the contrary, the invention intends covering all the modifications, alternative and equivalent constructions that fall within the scope of the invention as defined in the claims.

In the following description, therefore, the use of "e.g.", "etc.", "or" indicates non-exclusive alternatives without limitation, unless otherwise indicated; the use of "also" means "including, but not limited to" unless otherwise indicated; the use of "includes/comprises" means "includes/comprises, but not limited to" unless otherwise indicated.

Figure 1:
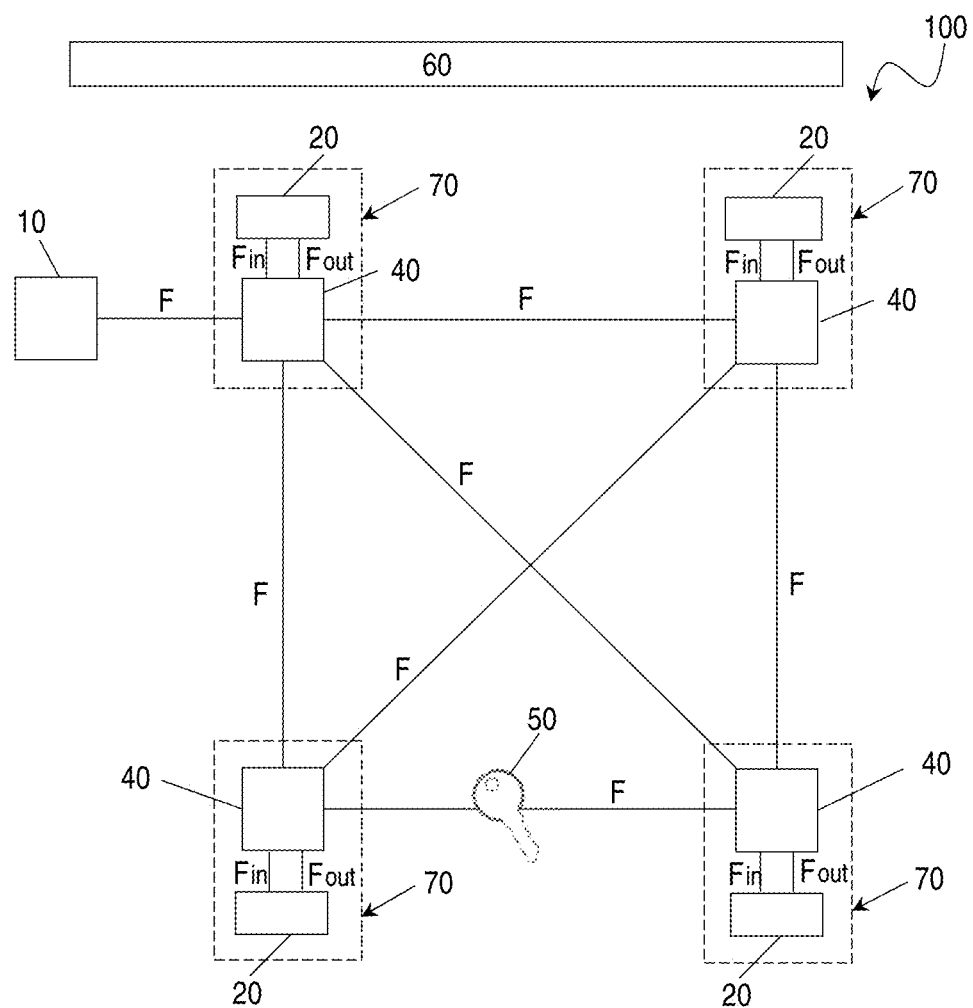
FIG. 1 schematically shows a network for the distribution of a quantum key according to a preferred embodiment of the present invention.

With reference to FIG. 1, a network for the distribution of a quantum key according to a preferred embodiment of the present invention is illustrated therein.

The network, generally referred to by reference number 100, comprises a source node 10 and a plurality of multifunctional nodes 20.

Each multifunctional node 20 of the network 100 is associated with an optical switching array 40, which is controllable by a supervisor device 60 to select the multifunctional nodes 20 that will form the distribution channel of the quantum key 50 exiting the source node 10. The optical switching arrays 40 of each multifunctional node 20 are connected to the source node 10, and therebetween, by respective optical communication channels, for example optical fibres F. Alternatively, each optical communication channel may be a free space communication channel.

Figure 2:
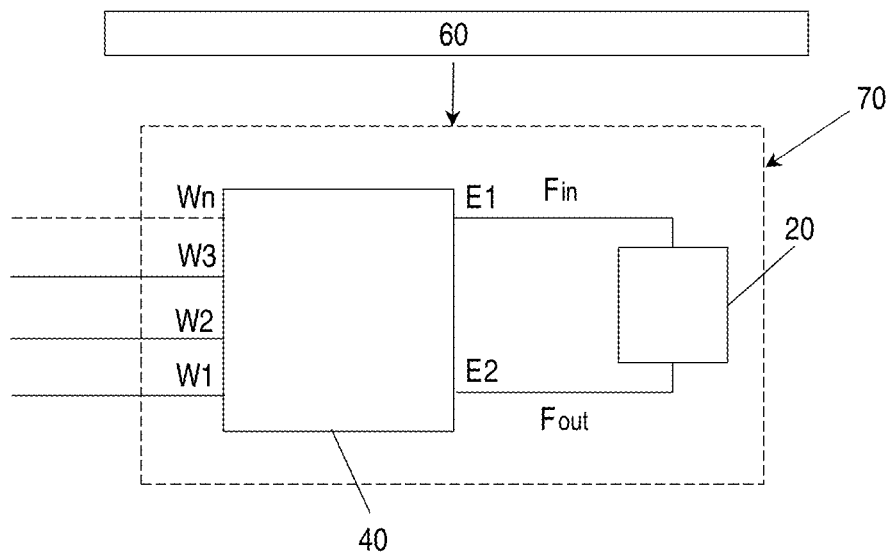
FIG. 2 schematically shows an optical switching array associated with each multifunctional node of the network for the distribution of a quantum key of FIG. 1, FIG. 3 schematically shows a single photon source node of the network for the distribution of a quantum key of FIG. 1.

As shown in greater detail in FIG. 2, each optical switching array 40 has first ports E1, E2, to which an input optical communication channel $F_{in}$ and an output optical communication channel $F_{out}$ of the respective multifunctional node 20 are respectively connected, and second ports W1, W2, ... Wn, which are connected, through the optical fibres $F_{out}$ to the source node 10 and/or to corresponding second ports W1, W2, ... Wn of one other optical switching array 40 of the network 100. The input optical communication channel $F_{in}$ and the output optical communication channel $F_{out}$ of each multifunctional node are optical fibres or, alternatively, a free space communication channel. The optical switching array 40 can be integrated into the multifunctional node 20 to form an integrated multifunctional node 70, in which case the input optical communication channel $F_{in}$ and output optical communication channel $F_{out}$ in the multifunctional node are fibre-optic integrated communication channels.

With reference to the network 100 of FIG. 1, the optical communication array 40 of each multifunctional node 20 is connected to the optical switching array of three multifunctional nodes 20, with the exception of the optical switching array 40 of the multifunctional node 20 placed at the top left, which is also connected to the source node 10. In such a configuration of the network 100, the optical switching array 40 also connected to the source node 10 will have four second ports W1-W4, one for the connection to the source node 10 and three for the connection to other optical switching arrays 40 of the network, while each of the other optical switching arrays 40 will have three second ports W1-W3 connected to respective optical switching arrays 40 of the network 100.

As will be explained in more detail later in this description, each multifunctional node 20 is structured so as to be able to operate according to two possible configurations, namely a transmitter configuration and a receiver configuration.

In particular, in the transmitter configuration, each multifunctional node 20 is configured to modulate photons arriving from the source node 10. Specifically, in the transmitter configuration, each multifunctional node 20 chooses the base, which may be rectilinear, diagonal or circular, and the state value, or code, which generates the logic sequence of bits that constitutes the quantum key, for example high logic state or 1 (equivalent to the spin up of the photon), low logic state or 0 (equivalent to the spin down of the photon). Furthermore, in the transmitter configuration, each multifunctional node 20 is configured to transmit the modulated photons received as input to an output. The supervisor device 60 also configures the optical switching array 40 associated with the multifunctional node 20 to direct the modulated photons towards another multifunctional node 20.

In the receiver configuration, each multifunctional node 20 is configured to demodulate the modulated photons arriving from a multifunctional node 20 in the transmitter configuration, i.e. to determine a receiving base and to extract the states value or code associated with each photon.

Figure 3:
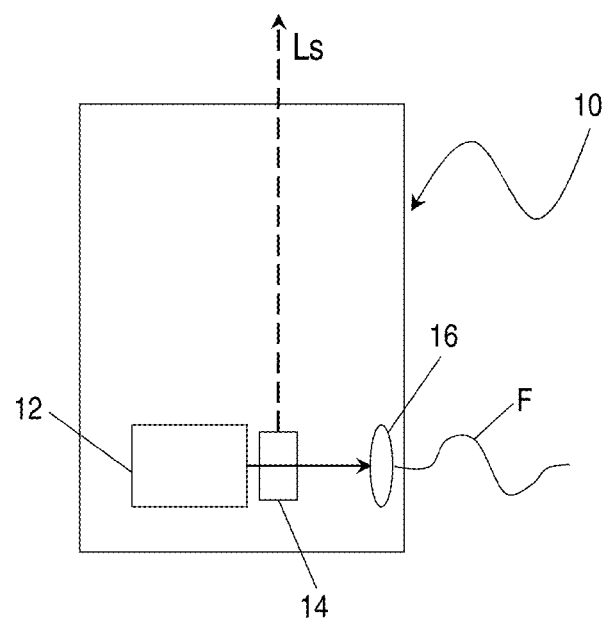

With reference to FIG. 3, the source node 10 comprises a single photon source 12, i.e. a source weakened in intensity to the point of transmitting on average only one photon (faint source) per command pulse. Preferably, the source node 10 further comprises a shutter 14, placed immediately downstream of the single photon source 12 and having the function of generating a synchronism signal, which is distributed among all multifunctional nodes 20 of the network 100 along a synchronism line Ls.

Alternatively, the single photon source 12 is of the heralded type, i.e. configured to generate a pair of photons, one of which is used in the network 100, to generate the quantum key 50, and the other is used to establish the synchronism signal to be distributed along the network 100 through the synchronism channel Ls.

Finally, the source node 10 comprises an optical output port 16, represented by a lens (if the subsequent optical components operate in free space), by a fibre-to-fibre welding or by a single fiber-optic connector if the communication channel is of fiber-optic type. In the example described herein, the optical output port 16 consists of a connector, to which an optical fibre F is connected, which connects the source node 10 to an optical switching array 40 of the network 100.

Figure 4:
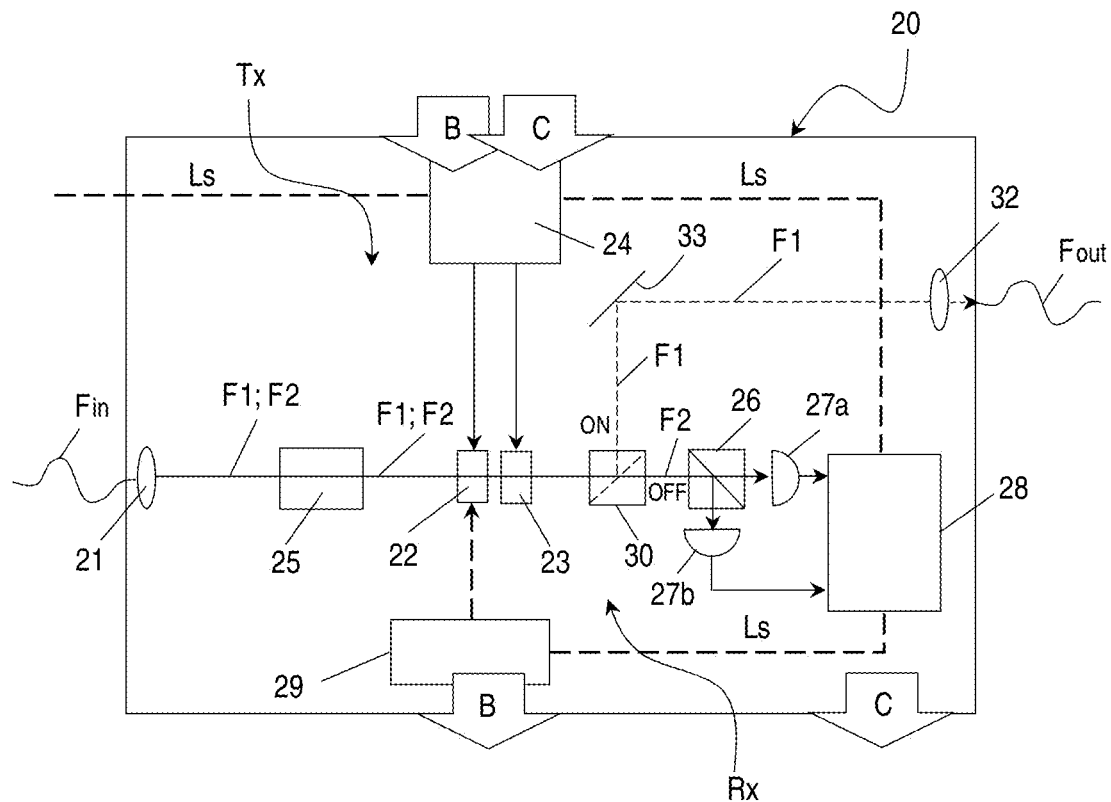
FIG. 4 schematically shows a multifunctional node according to a first embodiment of the present invention.

FIG. 4 illustrates in detail a multifunctional node 20 according to a first embodiment of the present invention.

The multifunctional node 20 comprises an optical input port 21, e.g. a fiber-optic connector, on which it receives the entering photons. As indicated above, these photons may come from the source node 10 or from one other multifunctional node 20 of the network.

The multifunctional node 20 further comprises an optical output port 32, for example a fiber-optic connector, which allows photons to be transmitted on the optical output communication channel $F_{out}$ to send them to another multifunctional node 20 of the network 100.

The optical input port 21 and the optical output port 32 of the multifunctional node 20 may have the shape of a lens, if the subsequent optical components operate in free space, the shape of a fibre-to-fibre welding or the shape of a single-mode fiber-optic connector.

The multifunctional node 20 further comprises, downstream of the optical input port 21, a first waveplate 22 and a second waveplate 23, controlled by a first actuator 24 and to which the single polarized photons, or qubits, exiting the single photon source 12 of the source node 10 are sent.

The first waveplate 22 allows to establish the base B of the spin of the polarized photon entering the multifunctional node 20 through the optical fibre $F_{in}$, while the second waveplate 23 allows to establish the state or code C which generates the logic sequence of bits constituting the key (e.g. high logic state equivalent to 1, low logic state equivalent to 0). The base is established starting from a predefined state by the action of half-wave or quarter-wave waveplates, as is well known to experts in the field. The value of the (high or low) logic state can be generated by a half-wave waveplate suitably oriented according to the chosen base, as is well known to experts in the field.

Since the input optical fibre $F_{in}$ of the multifunctional node 20 generally exhibits birefringence, the multifunctional node 20 further comprises, upstream of the waveplates 22 and 23, a polarization stabilizer 25, which is connected between the optical input port 21 and the first waveplate 22, to receive the entering polarized photon and reorient the base B of the spin of the photon. The polarization stabilizer restores the original configuration of the Poincaré sphere used for the modulation of the qu-bits, in all its three axes, for example the model EPS 1000 manufactured and marketed by the German company Novoptel GmbH.

The polarization stabilizer 25, the first waveplate 22, the second waveplate 23 and the first actuator 24 of the waveplates constitute a transmitting unit Tx of the multifunctional node 20 and are in connection therebetween, and with the optical input port 21 and the optical output port 32, through an optical transmission communication channel, for example an optical fibre F1 or a free space optical communication channel.

The multifunctional node 20 further comprises, downstream of the retarder blades 22 and 23, a polarizing beam splitter 26, to which each polarized photon exiting the retarder blades 22 and 23 is directed. In particular, the polarizing beam splitter 26 is configured to distinguish the high logic state 1 or the low logic state 0 of the photon and to transmit them to photodetectors 27a and 27b, which, in turn, transmit them to a counting register 28, to allow reconstruction of the message code.

The multifunctional node 20 further comprises a second actuator 29 of the first waveplate 22, which is connected, through the synchronism line Ls, to the counting register 28 and to the first waveplate 22 and controls the first waveplate 22 so as to restore the initial base B by a random procedure.

The polarization stabilizer 25, the first waveplate 22, controlled by the second actuator 29, the polarizing beam splitter 26, the photodetectors 27a and 27b and the counting register 28 constitute a receiving unit Rx of the multifunctional node 20 and are in connection therebetween, and with the optical input port 21, through a receiving optical communication channel, for example an optical fibre F2 or a free space optical communication channel.

An optical switch 30 is provided between the second waveplate 23 and the polarizing beam splitter 26.

When the multifunctional node 20 is in transmitter configuration, the optical switch 30 is switched on (ON position in FIG. 4) and the photons are diverted to a mirror 33, which sends them to the optical output port 32.

In this case, the polarized photon from the source node 10 enters the optical input port 21 through the input optical communication channel $F_{in}$ and moves along the transmission optical communication channel F1.

In particular, the photon enters the polarization stabilizer 25 and then continues through the first waveplate 22 and the second waveplate 23. The polarization stabilizer 25 compensates for any birefringence present in the optical fibres crossed by the polarized photon, while the first waveplate 22 and the second waveplate 23 are controlled by the first actuator 25, so as to generate the base B and the transmission code C according to the BB84 protocol.

The photon continues its path towards the optical switch 30, which, being switched on, directs the photon towards the mirror 33 and from there to the optical output port 32. The photon exiting the optical output port 32 is then directed to other multifunctional nodes 20 of the network 100 through the optical output communication channel $F_{out}$ and the respective optical switching arrays 40.

Preferably, the optical path between the polarization stabilizer 25 and the optical switch 30 must be free of birefringence. Furthermore, in the transmitter configuration of the multifunctional node 20, the second actuator is deactivated, so that the connection between the second actuator 29 and the first waveplate 22 is interrupted.

When the multifunctional node 20 is in receiver configuration, the optical switch 30 is switched off (OFF position in FIG. 4).

In this case, the polarized photon coming from a multifunctional node 20 of the network 100 in transmitter configuration enters the optical input port 21 through the input optical communication channel $F_{in}$ and moves along a receiving optical communication channel F2.

In particular, the photon enters the polarization stabilizer 25 and continues in the first waveplate 22 and in the second waveplate 23. The photon continues its path towards the optical switch 30, which, being switched off, directs the photon towards the polarizing beam splitter 26, which distinguishes the high logic state 1 or the low logic state 0 of the photon and transmits it, through the photodetectors 27a and 27b, to the counting register 28, in order to allow the reconstruction of the receiving code C.

The optical path between the polarization stabilizer 25, the optical switch 30 and the polarizing beam splitter 26 must be free of birefringence. Furthermore, in the receiver configuration of the multifunctional node 20, the first actuator 24 is deactivated, so that the connection between the first actuator 24 and the first waveplate 22 is interrupted, and the second waveplate 23 is set to zero birefringence value (i.e. the plate is oriented according to the main axes with zero delay).

In both configurations—transmitter and receiver—of the multifunctional node 20, the integrity of the BB84 protocol is fully satisfied. In fact, when the multifunctional node 20 is in transmitter configuration, only the node knows both the base B and the code C of the transmitted quantum key 50, while when the multifunctional node 20 is in receiver configuration, both base B and code C information are possessed by the receiving unit Rx only.

Figure 5:
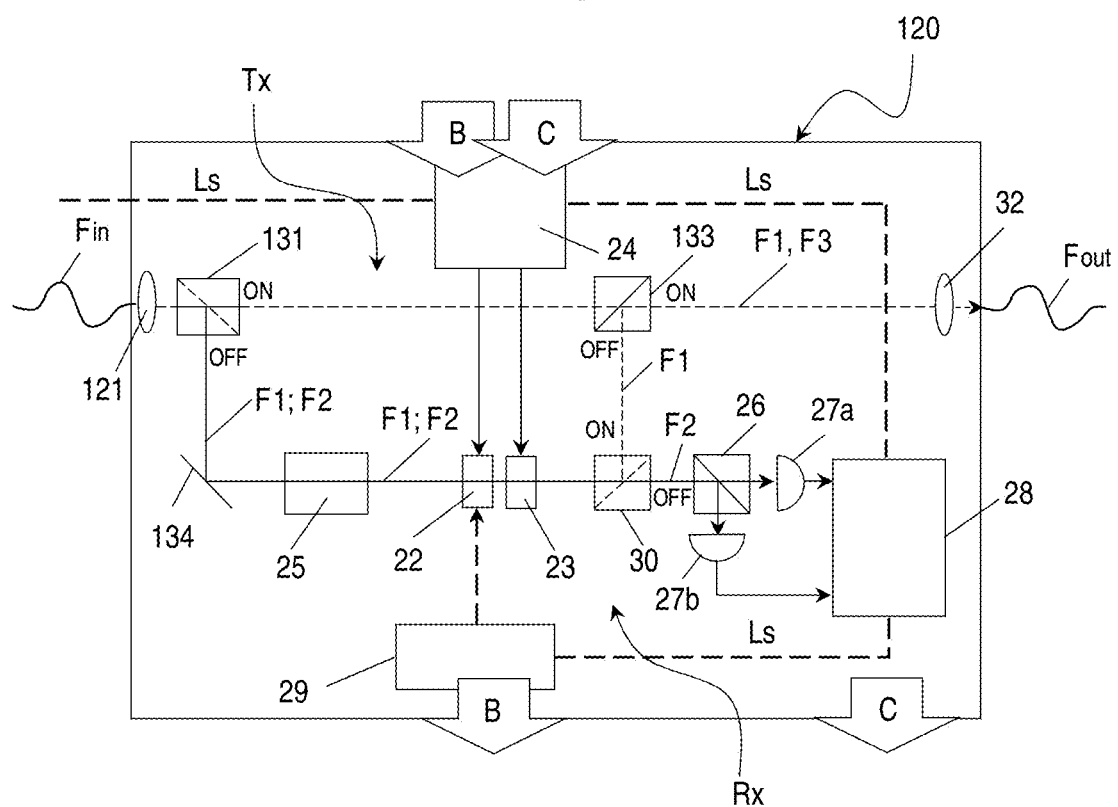
FIG. 5 schematically shows a multifunctional node in accordance with a second embodiment of the present invention.

FIG. 5 illustrates in detail a multifunctional node 120 in accordance with a second embodiment of the present invention.

The multifunctional node 120 differs from the multifunctional node 20, described above, in that it comprises further optical means adapted to allow the photons received as input to follow a path directed towards the output port 32. In this way, the multifunctional node 120 is able to operate also as a pass-through node, which neither modulates nor demodulates photons, but simply lets them pass through itself. Such a configuration may be useful in certain network configurations.

Immediately after the input port 21, the multifunctional node 120 therefore comprises two optical switches 131 and 133, capable of assuming two positions when switched on or off. In particular, the optical switch 131 is placed between the optical input port 21 and the polarization stabilizer 25, while the other optical switch 133 is placed upstream of the optical output port 32. The two optical switches 131 and 133 are aligned along a linear optical path connecting the input port 21 to the output port 32. In the example of FIG. 5, when the optical switches 131 and 133 are switched on (ON position in FIG. 5), the entering photons pass through them and continue until they reach the output port 32.

When the optical switches 131 133 are switched off (OFF position in FIG. 5), on the other hand, the photons are sent to the polarization stabilizer 25 where they continue and are processed exactly as described above with reference to the multifunctional node 20, in order to be received (if the node is in receiver configuration) or modulated (if the node is in transmitter configuration). In the example of FIG. 5, the photons diverted by the optical switch 131 are directed to the polarization stabilizer 25 by means of a mirror 134, which is used to define the optical path. In the case where the multifunctional node 120 is in transmitter configuration, the modulated photons exiting the waveplate 23 are diverted towards the optical switch 133 which—being in the OFF position—diverts them towards the output port 32.

Figure 6:
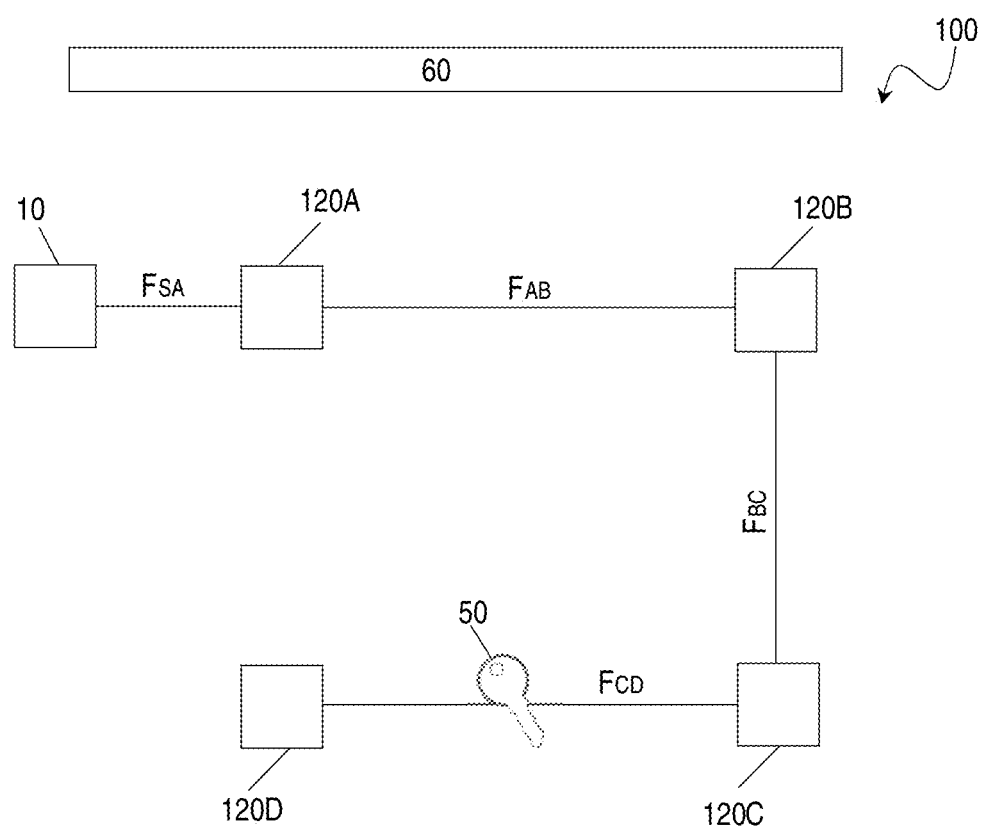
FIG. 6 schematically shows a network for the distribution of a quantum key in a possible operating configuration of the multifunctional nodes that compose it.

FIG. 6 illustrates a possible configuration of the network 100 for the distribution of a quantum key according to an embodiment of the present invention, which comprises a source node 10 and four multifunctional nodes (120a, 120B, 120C and 120D), connected to each other by respective optical fibres FAB, FBC, FCD. In the example of FIG. 6, the optical input port 21 of the multifunctional node 120A is connected to the source node 10 by an optical fibre FSA.

In the network configuration of FIG. 6, the multifunctional nodes are of the three-configuration type (pass-through, transmitter and receiver) described above with reference to FIG. 5, however the node 120D can be of the two-configuration type (receiver and transmitter) of FIG. 4 as, in this position, it will never perform the pass-through function.

Let us now assume that we wish to distribute a quantum key 50 between the third and fourth multifunctional node 120C and 120D of the network 100.

For this purpose, the supervisor device 60 configures the first and second multifunctional node 120A and 120B in the pass-through configuration, i.e. it switches on their optical switches 131 and 133 to allow the photons received as input to be retransmitted to the output. The supervisor device 60 configures, instead, the third multifunctional node 120C in the transmitter configuration and the fourth multifunctional node 120D in the receiver configuration.

A photon generated by the source node 10 then enters the multifunctional node 120A in pass-through configuration and, as shown in detail in FIG. 5, is directed directly to the optical switch 133, i.e. without entering the transmitting unit Tx or the receiving unit Rx, and from there the optical output port 32, moving along the pass-through optical communication channel F3.

The photon, exiting the optical output port 32 of the multifunctional node 120A, is then directed along the optical communication channel FAB, to the second pass-through multifunctional node 120B and, similarly to what is described above with reference to the first pass-through multifunctional node 120A, is directed by the optical switch 133 directly to the optical output port 32, moving along the pass-through optical communication channel F3.

The photon, exiting the optical output port 32 of the pass-through multifunctional node 120B, is then directed through the optical communication channel FBC to the third multifunctional node 120C in transmitter configuration. Here the photon is modulated.

In particular, and with reference to FIG. 5, the photon enters the polarization stabilizer 25 and, from this, the first waveplate 22 and the second waveplate 23, which are controlled by the first actuator 24, so as to generate the base B and the transmission code C according to the BB84 protocol.

The photon is then directed by the optical switch 133 towards the optical output port 32 and, from there, through the optical communication channel FCD, the photon is received as input to the multifunctional node 120D which acts as a receiver.

In particular, and with reference to FIG. 5, the photon enters the polarization stabilizer 25 and from this the first waveplate 22 and the second waveplate 23, so as to generate the receiving base B according to the BB84 protocol. To this end, and as explained above, the first waveplate 22 is controlled by the second actuator 29, while the polarization stabilizer 25 compensates for any birefringence present in the optical fibres crossed by the polarized photon, while the second waveplate 23 is set at zero birefringence value.

The photon is then directed to the polarizing beam splitter 26, which distinguishes the high logic state 1 or the low logic state 0 of the photon and transmits it to the photodetectors 27a and 27b, and from them to the counting register 28, in order to allow the reconstruction of the receiving code C.

From the above description, it is evident that the system and the network for the distribution of a quantum key described above can achieve the proposed aims. In particular, it is evident that the multifunctional node described above can be used with great flexibility to create networks of different type.

It is therefore obvious to a person skilled in the art that it is possible to make changes and variations to the solution described with reference to the figures without exceeding the scope of protection of the present invention as defined by the appended claims.

For example, it is evident that the node 120 may be used in place of the node 20 in the network of FIG. 1.

The invention claimed is:

1. A network for the distribution of a quantum key, comprising: a source node comprising a single photon source and a plurality of multifunctional nodes, which are connected to the source node, and therebetween, by respective optical communication channels, wherein each multifunctional node comprises:
    a transmitting unit, including a polarization stabilizer connected to an optical input port to receive a photon transmitted by a source node, a first waveplate and a second waveplate placed downstream of the polarization stabilizer and controlled by a first actuator;
    a receiving unit, including the polarization stabilizer, the first waveplate controlled by a second actuator, a polarizing beam splitter, placed downstream of the first waveplate and configured to detect a logic state of each photon, at least one photodetector and a counting register configured to receive the logic state of the detected photon;
    an optical switch placed between the second waveplate and the polarizing beam splitter and which can be activated/deactivated to operate the multifunctional node according to one of the following two configurations:
    a transmitter configuration, wherein the transmitting unit modulates the photon, entering the multifunctional node through the optical input port, and provides the modulated polarized photon at an optical output port of the multifunctional node; and
    a receiver configuration, wherein the receiving unit demodulates the modulated photon, entering the multifunctional node through the optical input port.

2. The network according to claim 1, wherein the network comprises a supervisor device and an optical switching array is associated to each multifunctional node, wherein the optical switching array is operable by the supervisor device to select the multifunctional nodes forming the optical communication channel for the distribution of the quantum key exiting the source node.

3. The network according to claim 2, wherein the optical switching array has first ports, to which an input optical communication channel and an output optical communication channel of a respective multifunctional node are respectively connected, and second ports, which are connected to the source node and/or to corresponding second ports of an optical switching array of at least one other multifunctional node of the network.

4. The network according to claim 1, wherein each multifunctional node further comprises a mirror, which is placed upstream of the optical output port.

5. The network according to claim 1, wherein each multifunctional node comprises two further optical switches, one being placed between the optical input port and the polarization stabilizer and the other being placed upstream of the optical output port, wherein the two further optical switches can be activated to operate the multifunctional node according to a pass-through configuration, wherein the optical input port is in direct communication with the optical output port of the multifunctional node through a pass-through optical communication channel which passes through the two further optical switches.

6. The network according to claim 5, wherein the optical switches of each multifunctional node are operable by the supervisor device to configure each multifunctional node in the transmitter, receiver or pass-through configuration.

7. The network according to claim 1, wherein the source node comprises a shutter, placed downstream of the single photon source and configured to generate a synchronism signal, which is distributed among all nodes of the network along a synchronism line.

8. The network according to claim 1, wherein the single photon source of the source node is configured to generate a couple of photons, one of which is used in the network, to generate the quantum key and the other is used to establish the synchronism signal to be distributed along the network through a synchronism channel.

9. A multifunctional node, comprising:
    a transmitting unit, including a polarization stabilizer connected to an optical input port to receive a photon transmitted by a source node, a first waveplate and a second waveplate placed downstream of the polarization stabilizer and controlled by a first actuator;
    a receiving unit, including the polarization stabilizer, the first waveplate controlled by a second actuator, a polarizing beam splitter, placed downstream of the first waveplate and configured to detect a logic state of each photon, at least one photodetector and a counting register configured to receive the logic state of the detected photon;
    an optical switch placed between the second waveplate and the polarizing beam splitter and which can be activated/deactivated to operate the multifunctional node according to one of the following two configurations:
    a transmitter configuration, wherein the transmitting unit modulates the photon, entering the multifunctional node through the optical input port, and provides the modulated polarized photon at an optical output port of the multifunctional node; and
    a receiver configuration, wherein the receiving unit demodulates the modulated photon, entering the multifunctional node through the optical input port.

10. The multifunctional node according to claim 9, wherein in the transmitter configuration, the optical switch is switched on and the second actuator for controlling the first waveplate is deactivated, so as to interrupt the connection between the second actuator and the first waveplate, while in the receiver configuration the optical switch is switched off, the first actuator controlling the first waveplate and the second waveplate is deactivated, so as to interrupt the connection between the first actuator and the first waveplate, and the second waveplate is set at zero birefringence value.

11. The multifunctional node according to claim 9 further comprising a mirror placed upstream of the optical output port.

12. The multifunctional node according to claim 9, further comprising two further optical switches, one optical switch placed between the optical input port and the polarization stabilizer and the other optical switch placed upstream of the optical output port, wherein the two further optical switches can be activated to operate the multifunctional node according to a pass-through configuration, wherein the optical input port is in direct communication with the optical output port of the multifunctional node through a pass-through optical communication channel which passes through the two further optical switches.

13. The multifunctional node according to claim 9, wherein the transmitting unit is connected between the optical input port and the optical output port through a transmission optical communication channel, while the receiving unit is connected to the optical input port through a receiving optical communication channel.

14. The multifunctional node according to claim 12, wherein, in the transmitter configuration, the optical switch is switched on, the two further optical switches are switched off and the second actuator for controlling the first waveplate is deactivated, so as to interrupt the connection between the second actuator and the first waveplate, while in the receiver configuration, the optical switches are switched off, the first actuator controlling the first waveplate and the second waveplate is deactivated, so as to interrupt the connection between the first actuator and the first waveplate, and the second waveplate is set at zero birefringence value.

15. The multifunctional node according to claim 12, wherein in the pass-through configuration, the two further optical switches are switched on.

\* \* \* \* \*